(12) United States Patent
Derenzo et al.

(10) Patent No.: US 11,841,471 B2
(45) Date of Patent: Dec. 12, 2023

(54) TRIPLE-MODE DETECTOR FOR FAST NEUTRONS, SLOW NEUTRONS, AND GAMMA RAY SPECTROSCOPY

(71) Applicant: The Regents of the University of California, Oakland, CA (US)

(72) Inventors: Stephen Derenzo, Pinole, CA (US); Edith Bourret, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 67 days.

(21) Appl. No.: 17/474,256

(22) Filed: Sep. 14, 2021

(65) Prior Publication Data

US 2022/0091288 A1 Mar. 24, 2022

Related U.S. Application Data

(60) Provisional application No. 63/081,096, filed on Sep. 21, 2020.

(51) Int. Cl.
   *G01T 3/06* (2006.01)
(52) U.S. Cl.
   CPC ...................... *G01T 3/06* (2013.01)
(58) Field of Classification Search
   CPC .............................. G01T 3/06; G01T 1/2008
   See application file for complete search history.

(56) References Cited

U.S. PATENT DOCUMENTS

| | | | | | |
|---|---|---|---|---|---|
| 4,463,264 A | * | 7/1984 | Young | .................. | H01J 47/12 250/391 |
| 4,547,892 A | * | 10/1985 | Richey | .................. | G06T 11/005 600/428 |
| 5,078,952 A | * | 1/1992 | Gozani | .................. | G01V 5/0069 376/161 |
| 5,336,889 A | * | 8/1994 | Hofstetter | .................. | G01T 1/203 250/361 R |
| 6,140,651 A | * | 10/2000 | Justus | .................. | G01T 3/06 250/484.5 |

(Continued)

OTHER PUBLICATIONS

Derenzo et al., "Monte Carlo Calculations of the Detection Efficiency of Composite Scintillator Arrays for Fast and Moderated Neutrons, and for Gamma-Ray Spectroscopy," IEEE Transactions on Nuclear Science, vol. 67, No. 6, pp. 888-893, (Jun. 2020).

(Continued)

*Primary Examiner* — David P Porta
*Assistant Examiner* — Djura Malevic

(57) ABSTRACT

This disclosure provides systems, methods, and apparatus related to neutron detection and gamma ray detection. In one aspect, a detector comprises a scintillator structure that comprises an organic scintillator and an inorganic scintillator. The organic scintillator is in the form of one or more elements of a specified length. The inorganic scintillator is in the form of one or more elements of the specified length. First ends of the one or more organic scintillator elements and first ends of the one or more inorganic scintillator elements define a first surface. Second ends of the one or more organic scintillator elements and second ends of the one or more inorganic scintillator elements define a second surface.

20 Claims, 14 Drawing Sheets

(56) References Cited

U.S. PATENT DOCUMENTS

| | | | | |
|---|---|---|---|---|
| 6,180,946 | B1* | 1/2001 | Ebstein | G01T 1/295 250/370.11 |
| 6,495,837 | B2* | 12/2002 | Odom | G01T 3/06 250/269.4 |
| 6,566,657 | B2* | 5/2003 | Odom | G01T 3/06 250/390.11 |
| 6,639,210 | B2* | 10/2003 | Odom | G01T 3/06 250/269.6 |
| 7,141,804 | B1* | 11/2006 | Akselrod | G01T 1/36 250/484.5 |
| 7,525,101 | B2* | 4/2009 | Grodzins | G01T 1/2018 250/390.11 |
| 7,919,758 | B2* | 4/2011 | Stephan | H01J 47/1255 250/390.04 |
| 8,624,195 | B2* | 1/2014 | Nelson | G01T 3/001 250/370.05 |
| 8,729,487 | B2* | 5/2014 | Stephan | G01T 3/008 250/382 |
| 8,963,094 | B2* | 2/2015 | Gozani | G01V 5/0075 250/363.02 |
| 8,973,257 | B2* | 3/2015 | Stephan | H01J 47/1205 29/830 |
| 9,261,624 | B2* | 2/2016 | Vasilyev | G01V 5/107 |
| 9,329,285 | B2* | 5/2016 | Gozani | G01V 5/0075 |
| 9,482,763 | B2* | 11/2016 | Vasilyev | G01V 5/125 |
| 9,864,074 | B1* | 1/2018 | Newman | G01T 1/169 |
| 9,939,538 | B2* | 4/2018 | Ing | G01T 1/02 |
| 9,977,138 | B2* | 5/2018 | Kunimoto | A61N 5/1075 |
| 10,101,472 | B1* | 10/2018 | Newman | G01T 1/208 |
| 10,416,318 | B1* | 9/2019 | Newman | G01V 5/0075 |
| 10,520,610 | B2* | 12/2019 | Lam | G01T 1/2002 |
| 10,605,932 | B1* | 3/2020 | Newman | G01T 3/00 |
| 10,996,353 | B1* | 5/2021 | Guardala | G01T 3/085 |
| 11,378,703 | B1* | 7/2022 | Watson | C09D 133/12 |
| 2002/0130258 | A1* | 9/2002 | Odom | G01T 3/06 250/269.6 |
| 2002/0130267 | A1* | 9/2002 | Odom | G01T 3/06 250/269.4 |
| 2002/0130268 | A1* | 9/2002 | Odom | G01T 3/06 250/390.11 |
| 2005/0023479 | A1* | 2/2005 | Grodzins | G01T 3/06 250/390.11 |
| 2005/0105665 | A1* | 5/2005 | Grodzins | G01N 23/04 376/157 |
| 2006/0163487 | A1* | 7/2006 | Ambrosi | G01T 3/00 250/390.01 |
| 2007/0153979 | A1* | 7/2007 | Baumann | A61B 6/4021 378/138 |
| 2009/0272910 | A1* | 11/2009 | Grynyov | G01T 3/06 250/390.11 |
| 2010/0019164 | A1* | 1/2010 | Stephan | G01T 3/00 250/390.11 |
| 2010/0294415 | A1* | 11/2010 | Frank | G01T 3/065 156/64 |
| 2011/0266448 | A1* | 11/2011 | Burgett | G01T 3/06 250/361 R |
| 2013/0067741 | A1* | 3/2013 | Stephan | H01J 47/1205 29/846 |
| 2013/0068957 | A1* | 3/2013 | Stephan | G01T 3/008 250/385.1 |
| 2013/0075718 | A1* | 3/2013 | Nause | G01T 3/06 257/43 |
| 2013/0099125 | A1* | 4/2013 | Grodzins | G01T 1/2008 250/362 |
| 2013/0181137 | A1* | 7/2013 | Watanabe | C30B 29/12 250/369 |
| 2013/0240743 | A1* | 9/2013 | Nelson | G01T 3/001 250/391 |
| 2014/0042330 | A1* | 2/2014 | Gozani | G01V 5/0075 250/367 |
| 2014/0197321 | A1* | 7/2014 | Bendahan | G01T 1/2008 250/361 R |
| 2014/0270034 | A1* | 9/2014 | Clayton | G01V 5/0091 376/154 |
| 2015/0028217 | A1* | 1/2015 | Zaitseva | G21K 4/00 250/361 R |
| 2016/0091618 | A1* | 3/2016 | Gozani | G01T 3/06 250/361 R |
| 2017/0329028 | A1* | 11/2017 | Kunimoto | A61N 5/1075 |
| 2018/0172846 | A1* | 6/2018 | Lam | G01T 1/2018 |
| 2020/0025951 | A1* | 1/2020 | Kratsko | G01T 1/2008 |
| 2022/0120924 | A1* | 4/2022 | Chuirazzi | G01T 3/06 |

OTHER PUBLICATIONS

Mayer et al., "Geometric optimization of a neutron detector based on a lithium glass-polymer composite," Nuclear Instruments and Methods in Physics Research A, vol. 784, pp. 168-171, (Sep. 16, 2014).

Knoll et al., "Light collection in scintillation detector composites for neutron detection," IEEE Transactions on Nuclear Science, vol. 35, No. 1, (Feb. 1988).

Mayer et al., "Development and characterization of a neutron detector based on a lithium glass-polymer composite," Nuclear Instruments and Methods in Physics Research Section A: Accelerators, Spectrometers, Detectors and Associated Equipment, vol. 785, pp. 117-122, (Mar. 13, 2015).

Foster et al., "On the fabrication and characterization of heterogeneous composite neutron detectors with triple-pulse-shape-discrimination capability," Nuclear Instruments and Methods in Physics Research Section A: Accelerators, Spectrometers, Detectors and Associated Equipment, vol. 954, pp. 1-5, (Dec. 3, 2018).

Knitel et al., "LiBaF3, a thermal neutron scintillator with optimal n-γ discrimination," Nuclear Instruments and Methods in Physics Research Section A: Accelerators, Spectrometers, Detectors and Associated Equipment, vol. 374, No. 2, pp. 197-201, (May 1996).

Shah et al., "RbGd/sub 2/Br/sub 7/:Ce scintillators for gamma-ray and thermal neutron detection," IEEE Transactions on Nuclear Science, vol. 49, No. 4, pp. 1655-1660, (Aug. 2002).

Bessiere et al., "New thermal neutron scintillators: Cs2LiYCl6:Ce3+ and Cs2LiYBr6: Ce3+," IEEE Transactions on Nuclear Science, vol. 51, No. 5, pp. 2970-2972, (Oct. 2004).

Birowosuto et al., "Li-Based Thermal Neutron Scintillator Research; Rb2LiYBr6:Ce3+ and Other Elpasolites," EEE Transactions on Nuclear Science, vol. 55, No. 3, pp. 1152-1155, (Jun. 2008).

Shirwadkar et al., "Scintillation properties of Cs2LiLaBr6 (CLLB) crystals with varying Ce3+ concentration," Nuclear Instruments and Methods in Physics Research Section A: Accelerators, Spectrometers, Detectors and Associated Equipment, vol. 652, No. 1, pp. 268-270, (Oct. 2011).

D'Olympia et al., "Pulse-shape analysis of CLYC for thermal neutrons, fast neutrons, and gamma-rays," Nuclear Instruments and Methods in Physics Research Section A: Accelerators, Spectrometers, Detectors and Associated Equipment, vol. 714, pp. 121-127, (Jun. 21, 2013).

Glodo et al., "Fast Neutron Detection With Cs2LiYCl6," IEEE Transactions on Nuclear Science, vol. 60, No. 2, pp. 864-870, (Apr. 2013).

Gueorguiev et al., "Composite Neutron Gamma Detector," Proceeding IEEE Nuclear Science Symposium Medical Imaging Conference, pp. 1-3, (Oct./Nov. 2015).

Lam et al., "A High-Performance CLYC(Ce)-PVT Composite for Neutron and Gamma Detection," IEEE Transactions on Nuclear Science, vol. 65, No. 1, pp. 609-615, (Jan. 2018).

Zaitseva et al., "Plastic scintillators with efficient neutron/gamma pulse shape discrimination," Nuclear Instruments and Methods in Physics Research Section A: Accelerators, Spectrometers, Detectors and Associated Equipment, vol. 668, pp. 88-93, (Mar. 11, 2012).

Zaitseva et al., "Pulse shape discrimination with lithium-containing organic scintillators," Nuclear Instruments and Methods in Physics Research Section A: Accelerators, Spectrometers, Detectors and Associated Equipment, vol. 729 pp. 747-754, (Nov. 21, 2013).

Mabe et al., "Transparent plastic scintillators for neutron detection based on lithium salicylate," Nuclear Instruments and Methods in

(56) References Cited

OTHER PUBLICATIONS

Physics Research Section A: Accelerators, Spectrometers, Detectors and Associated Equipment, vol. 806, pp. 80-86, (Jan. 11, 2016).
Cherepy et al., "Bismuth- and lithium-loaded plastic scintillators for gamma and neutron detection," Nuclear Instruments and Methods in Physics Research Section A: Accelerators, Spectrometers, Detectors and Associated Equipment, vol. 778, pp. 126-132, (Apr. 1, 2015).
Pawelczak et al., "Boron-loaded plastic scintillator with neutron-γ pulse shape discrimination capability," Nuclear Instruments and Methods in Physics Research Section A: Accelerators, Spectrometers, Detectors and Associated Equipment, vol. 751, pp. 62-69, (Jul. 1, 2014).
Drake et al., "New Electronically Black Neutron Dectors," Nuclear Instruments and Methods in Physics Research Section A: Accelerators, Spectrometers, Detectors and Associated Equipment, vol. 274, No. 3, pp. 576-582, (Jul. 1, 1986).
Pozzi et al., "Pulse shape discrimination in the plastic scintillator EJ-299-33," Nuclear Instruments and Methods in Physics Research Section A: Accelerators, Spectrometers, Detectors and Associated Equipment, vol. 723, pp. 19-23, (Sep. 21, 2013).

* cited by examiner

TRIPLE-MODE DETECTOR FOR FAST NEUTRONS, SLOW NEUTRONS, AND GAMMA RAY SPECTROSCOPY

RELATED APPLICATIONS

This application claims priority to U.S. Provisional Patent Application No. 63/081,096, filed Sep. 21, 2020, which is herein incorporated by reference.

STATEMENT OF GOVERNMENT SUPPORT

This invention was made with government support under Contract No. DE-AC02-05CH11231 awarded by the U.S. Department of Energy. The government has certain rights in this invention.

TECHNICAL FIELD

This disclosure relates generally to neutron detection and gamma ray detection.

BACKGROUND

Fissionable materials can be distinguished from normal materials by their emission of fast neutrons, whose presence is often detected once they have become slow neutrons. In addition, fissionable materials can have unique gamma-ray signatures that depend on their production history. The best detection scenario for fissionable materials should provide simultaneous thermal/fast neutron detection and gamma discrimination with gamma spectroscopy.

Organic scintillators are commonly employed in fast neutron detection due to their high concentration of hydrogen. The high concentration of hydrogen renders neutron scattering on protons highly probable. Some organic scintillators also exhibit different scintillation pulse behavior for different types of incident radiation, allowing for the discrimination of x-rays and gamma rays from fast neutrons. Slow neutrons, however, do not have sufficient kinetic energy to transfer via proton recoil and are not detected by standard organic scintillators. Detection of these low-energy neutrons is achieved by materials containing isotopes (notably 3He, 6Li and 10B) having high cross-sections for neutron capture.

For solid-state neutron detectors, triple discrimination of fast/slow neutrons and gamma photons in lithium-doped plastic scintillators has been reported in the last few years. Researchers modified the plastic scintillator by adding suitable Li organic salts, which enabled slow neutron detection by capture on 6Li. Although interesting, these Li-containing plastics are in an experimental stage and efforts to improve their scintillation properties are being carried out. In particular, the Li-content is low, and their light yield is somewhat degraded with respect to similar undoped plastics. Moreover, no reports on the durability over time of these material properties have been presented, particularly for the stability of Li inside the polymer itself.

B-doped plastics are available on the market and have been the subject of study for a longer time. Although 10B capture cross section for thermal neutrons is larger than the 6Li capture cross section, and the commercial plastics contain a higher amount of boron, the neutron capture on 10B results in two possible reactions. One reaction releases high-energy gamma rays, which are undesirable because of their effect on the pulse shape discrimination. Moreover, these plastics are still very expensive with, prices approximately hundreds of dollars per cubic inch.

Fast-neutron/gamma discriminating plastics are available on the market, and are characterized by excellent stability on both optical and scintillation characteristics. However, due to their very low effective atomic number ($Z_{eff}$) these materials cannot be used for gamma spectroscopy, because the vast majority of the interactions of high-energy photons occurs by Compton scattering.

Bi-containing plastics have been recently reported in the literature. The addition of Bi increases remarkably the probability of photoelectric effect in the plastic scintillator, and some formulations do show some gamma spectroscopy capability without strongly affecting the luminescence efficiency of the plastic itself. These plastics, however, are also characterized by poor energy resolution when compared to fielded inorganic scintillators.

Fast neutron composite detectors for neutron counting are also a well-established product. These detectors have a ZnS phosphor embedded in a hydrogen rich polymer matrix structured in a series of concentric cylinders of clear plastic to facilitate light collection. Recoil protons generated in the detector produce scintillation pulses in the phosphor. The fast neutron detection efficiency of these detectors is of the order of 2% for energies above 10 MeV, and quickly decreases to fractions of a percent for lower energies. Neutron/gamma discrimination is not easily performed with these kinds of detectors, and gamma rejection is obtained at the expense of neutron detection efficiency. ZnS:Ag mixed with a 6Li-enriched LiF and enclosed in plastics is produced for thermal neutron detection. However, these are only phosphor screens.

Inorganic scintillators, on the other hand, are not suitable for fast neutron detection due to the lack of hydrogen. There are, however, new lithium based materials that are very suitable for thermal neutron/gamma discrimination: NaI:Tl, Li, CsLiLaBr$_6$, and CsLiYCl$_6$ have been extensively studied and are available as commercial products.

SUMMARY

A detector that provides simultaneous thermal/fast neutron detection and gamma ray discrimination with gamma spectroscopy is described herein. The detector includes an organic scintillator in combination with an inorganic scintillator that contains a neutron capture isotope (e.g., 6Li or 10B) to add the third capability of gamma detection and spectroscopy. The organic and inorganic scintillators are read out separately by placing photodetectors at each end of the scintillator structure. The modular multi-functionality of the detector allows for adjustment for neutron detection and gamma ray spectroscopy across a wide range of operational scenarios.

One innovative aspect of the subject matter described in this disclosure can be implemented in a detector including a scintillator structure, with the scintillator structure comprising an organic scintillator and an inorganic scintillator. The organic scintillator is in the form of one or more elements of a specified length. The inorganic scintillator is the form of one or more elements of the specified length. First ends of the one or more organic scintillator elements and first ends of the one or more inorganic scintillator elements define a first surface. Second ends of the one or more organic scintillator elements and second ends of the one or more inorganic scintillator elements defining a second surface.

In some implementations, the detector further comprises a first photodetector positioned at the first surface of the scintillator structure and a second photodetector positioned at the second surface of the scintillator structure. In some implementations, the first photodetector comprises a first phototube and the second photodetector comprises a second phototube. The one or more organic scintillator elements are covered at the first surface of scintillator structure so that the first photodetector does not detect light generated by the one or more organic scintillator elements. The one or more inorganic scintillator elements are covered at the second surface of the scintillator structure so that the second photodetector does not detect light generated by the one or more inorganic scintillator elements.

In some implementations, the first photodetector comprises a first array of silicon photomultipliers (SiPMs). The first array of silicon photomultipliers is positioned to detect light generated by the one or more inorganic scintillator elements. The second photodetector comprises a second array of silicon photomultipliers. The second array of silicon photomultipliers is positioned to detect light generated by the one or more organic scintillator elements.

In some implementations, the one or more organic scintillator elements and the one or more inorganic scintillator elements are arranged such that there are essentially no gaps between the one or more organic scintillator elements and the one or more inorganic scintillator elements In some implementations, the detector is operable to detect fast neutrons and slow and to perform gamma ray spectroscopy.

In some implementations, an organic scintillator element has a square or a rectangular cross-section and inorganic scintillator element surrounds the square or the rectangular cross-section of the organic scintillator element and forms an outer square or rectangular cross section. In some implementations, dimensions of the square or the rectangular cross-section of the organic scintillator element are about 4 centimeters to 90 centimeters by about 4 centimeters to 90 centimeters. In some implementations, a thickness of the inorganic scintillator element surrounding and in contact with the square or the rectangular cross-section of the organic scintillator element is about 1 centimeter to 10 centimeters.

In some implementations, the specified length of the one or more elements of the organic scintillator and one or more elements of the inorganic scintillator is about 2 centimeters to 8 centimeters.

In some implementations, the inorganic scintillator comprises a heavy-atom inorganic scintillator that includes 6Li or B10. In some implementations, the inorganic scintillator is a scintillator from the group $Cs_2LiLaBr_6$:Ce (CLLB), $Cs_2LiYCl_6$:Ce (CLYC), and NaI(Tl+Li). In some implementations, the organic scintillator comprises a fast plastic scintillator. In some implementations, the organic scintillator is polyvinyl toluene (PVT).

In some implementations, the detector further comprises a first reflective mask and a second reflective mask. The first reflective mask covers the one or more organic scintillator elements at the first surface of the scintillator structure. The first reflective mask is operable to reflect light generated by the one or more organic scintillator elements to the second surface of the scintillator structure. The second reflective mask covers the one or more inorganic scintillator elements at the second surface of the scintillator structure. The second reflective mask is operable to reflect light generated by the one or more inorganic scintillator elements to the first surface of the scintillator structure.

In some implementations, the one of more organic scintillator elements and the one or more inorganic scintillator elements comprise 9 to 225 scintillator elements.

In some implementations, each of the one of more organic scintillator elements and each the one or more inorganic scintillator elements has a square cross section. Dimensions of the square cross section of each of the one of more organic scintillator elements and dimensions of the square cross section of each of the one of more inorganic scintillator elements are the same. In some implementations, dimensions of the square cross section are about 0.5 centimeters to 10 centimeters.

In some implementations, each of the one of more organic scintillator elements and each the one or more inorganic scintillator elements has a hexagonal cross section. Dimensions of the hexagonal cross section of each of the one of more organic scintillator elements and dimensions of the hexagonal cross section of each of the one of more inorganic scintillator elements are the same. In some implementations, dimensions of the hexagonal cross section are about 0.5 centimeters to 10 centimeters.

In some implementations, the organic scintillator element comprises a cylinder. The one or more inorganic scintillator elements comprise cylinders disposed in the organic scintillator element.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
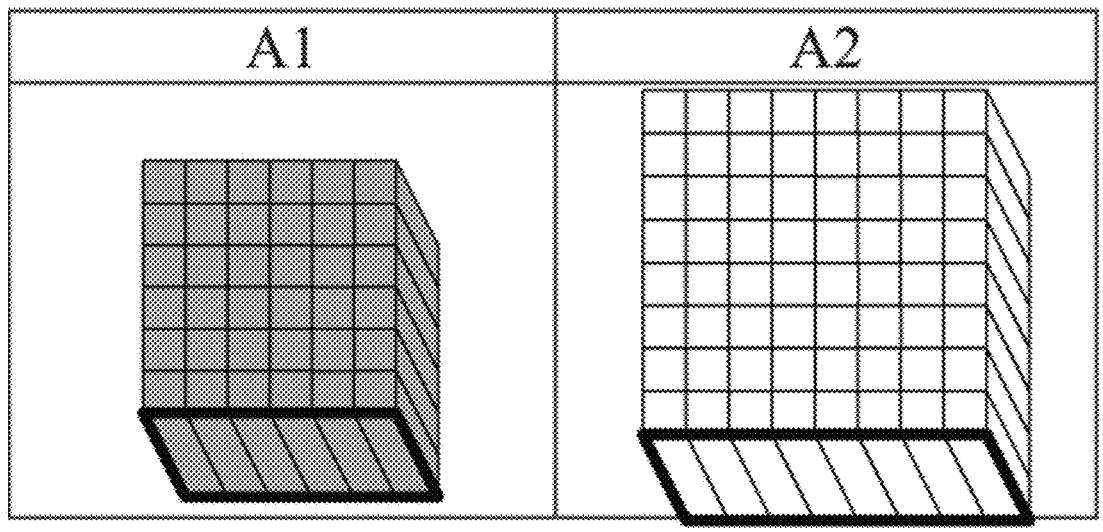
FIG. 1 shows the scintillator structure design for which detection efficiencies were calculated. Scintillator structure design A comprises A1, a 6×6 array of 36 CLLB (gray) scintillators and A2, a separate 8×8 array of 64 PVT (white) scintillators.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

The terms "about" or "approximate" and the like are synonymous and are used to indicate that the value modified by the term has an understood range associated with it, where the range can be ±20%, ±15%, ±10%, ±5%, or ±1%. The terms "substantially" and the like are used to indicate that a value is close to a targeted value, where close can mean, for example, the value is within 80% of the targeted value, within 85% of the targeted value, within 90% of the targeted value, within 95% of the targeted value, or within 99% of the targeted value.

Described herein is a detector including an organic scintillator and an inorganic scintillator to achieve fast and slow neutron discrimination with gamma spectroscopy. The proximity of the organic and inorganic scintillators allows for the exploration of the capabilities of each, augmented by some interactions. While there scintillator materials are commercially available or in development for detection of neutrons with gamma discrimination and for gamma spectroscopy, there are none at this time that can efficiently do all of this.

Described herein is an alternate detection capability making use of the high concentration of 6Li or B10 and higher luminosity offered by some inorganic scintillators. The scintillator structure use a combination of an organic scintillator (e.g., an off the shelf, low cost plastic) for thermalization of fast neutrons and a 6Li or B10 containing inorganic scintillator (e.g., an off the shelf scintillator, such as NaLiI:Tl (NaILTM), CLYC, or CLLB) for capture of the low-energy neutrons. The inorganic scintillators provide the advantages of good gamma/neutron discrimination, good light output, and good gamma spectroscopy capability.

The organic scintillator serves these purposes:
(1) The high concentration of hydrogen atoms provides efficient detection of fast neutrons when they produce recoil protons that can be detected by their scintillation light.
(2) The fast scintillation response allows for discrimination against gamma rays because most fast neutrons produce multiple recoil protons whose scintillation signal is separated by several ns. A gamma ray always produces a sub-ns scintillation signal.
(3) Both fast and slow neutrons are efficiently reduced to thermal (i.e., 0.025 eV) energies by multiple elastic collisions with the hydrogen atoms.
(4) Gamma rays will frequently interact with electrons to produce Compton recoil electrons whose scintillation signal can be added to the signal from the inorganic scintillator (after normalizing by the luminosity ratio) for gamma ray spectroscopy.

The inorganic scintillator serve these purposes:
(1) The 6Li or B10 isotope has a high cross section (940 barns) for thermal neutrons. This produces a scintillation signal whose pulse shape is very different than those from gamma ray interactions.
(2) The high density of the inorganic scintillator provides efficient Compton scattering of higher energy gamma rays.
(3) The high atomic number of iodine provides efficient photoelectric absorption after the gamma ray energy has been reduced by Compton scattering.

Scintillation signals from (2) and (3) from the inorganic scintillator can be added to the gamma ray signal (4) from the organic scintillator (after normalizing by the luminosity ratio) for gamma ray spectroscopy.

In some embodiments, the organic scintillator and inorganic scintillator can be read out separately by placing photodetectors at each end of the scintillator structure. In some embodiments, reflective masks can be used to redirect photons from the opposite ends to the respective photodetectors. In some embodiments, the photodetectors comprise phototubes or arrays of silicon photomultipliers (SiPMs).

An important aspect of the detector is the ability to efficiently detect fast neutrons in the organic scintillator while using the time difference between proton recoils to discriminate against gammas. Receiver Operating Curves (ROC) can be used to determine the time difference that provides the best tradeoff between fast neutron detection (true positives) and gamma contamination (false positives). For composite detectors much larger than the 1 centimeter (cm) to 2 cm neutron scattering length in the organic scintillator, the optimal time difference will exclude some fast neutrons that produce only a single proton recoil (false negatives) but will almost never identify a gamma as a neutron (false positives).

In some embodiments, the detector is compact and detects three types of particles (i.e., fast neutrons, slow neutrons, and gamma rays) using two different scintillator materials. In some embodiments, the interactions between the scintillator materials and the detection mode using two proton recoils allows for full rejection of false positives.

Figure 10:
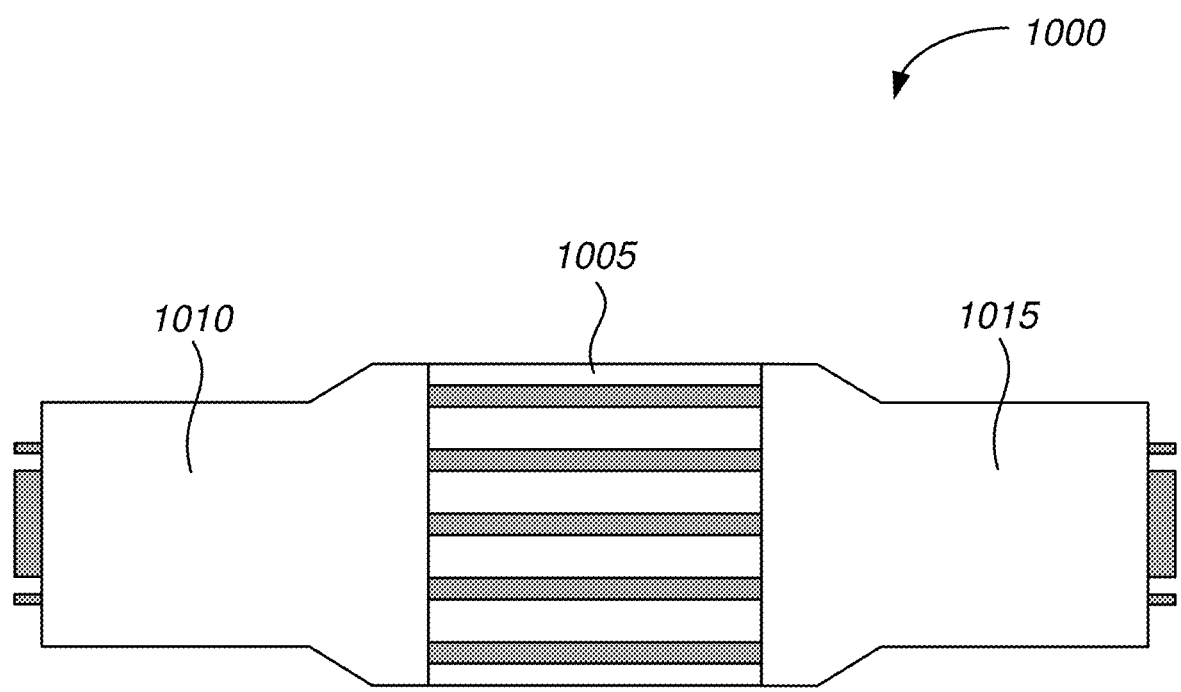
FIG. 10 shows an example of an illustration of a detector.

FIG. 10 shows an example of an illustration of a detector. As shown in FIG. 10, the detector 1000 includes a scintillator structure 1005, a first photodetector 1010 positioned at a first surface of the scintillator structure 1005, and a second photodetector 1015 positioned at a second surface of the scintillator structure 1005. In some embodiments, the first photodetector 1010 is optically coupled to the first surface of the scintillator structure 1005. In some embodiments, the second photodetector 1015 is optically coupled to the second surface of the scintillator structure 1005.

The scintillator structure comprises an organic scintillator and an inorganic scintillator. The organic scintillator is in the form of one or more elements of a specified length. The inorganic scintillator is in the form of one or more elements of the specified length. For example, in some embodiments, the scintillator structure comprises a block of the organic scintillator with one of more inorganic scintillator elements embedded therein. In some embodiments, the scintillator structure comprises a block of the inorganic scintillator with one of more organic scintillator elements embedded therein.

First ends of the one or more organic scintillator elements and first ends of the one or more inorganic scintillator elements define the first surface. In some embodiments, the first surface is substantially flat. Second ends of the one or more organic scintillator elements and second ends of the one or more inorganic scintillator elements define the second surface. In some embodiments, the second surface is substantially flat.

In some embodiments, the one or more organic scintillator elements and the one or more inorganic scintillator elements are arranged such that there are substantially no gaps or substantially no open space between the one or more organic scintillator elements and the one or more inorganic scintillator elements. In some embodiments, the one or more organic scintillator elements and the one or more inorganic scintillator elements are arranged such that there are gaps of up to about 10% of a cross sectional dimension of the scintillator elements between the one or more organic scintillator elements and the one or more inorganic scintillator elements.

In some embodiments, the specified length of the one or more elements of the organic scintillator and one or more elements of the inorganic scintillator is about 2 cm to 8 cm, or about 5 cm. In some embodiments, the specified length of the one or more elements of the organic scintillator and one or more elements of the inorganic scintillator are the same. Both the detection efficiency and the cost of the scintillator elements increase with increasing length of the one or more elements.

In some embodiments, the inorganic scintillator comprises a heavy-atom inorganic scintillator that includes 6Li or 10B. In some embodiments, the inorganic scintillator has a content of neutron capture isotopes (e.g., 6Li or 10B) large enough to detect greater than about 0.1% of the slow neutrons either incident or moderated by the hydrogen content of the organic scintillator. In some embodiments, the inorganic scintillator has a content of heavy atoms large enough to fully absorb greater than about 0.1% of incident gamma rays. In some embodiments, the inorganic scintillator is a scintillator from the group $Cs_2LiLaBr_6$:Ce (CLLB), $Cs_2LiYCl_6$:Ce (CLYC), and NaI(Tl+Li).

In some embodiments, the organic scintillator has a hydrogen content high enough to detect greater than 0.1% of incident fast neutrons. In some embodiments, the organic scintillator comprises a fast plastic scintillator. In some embodiments, the organic scintillator is polyvinyl toluene (PVT). Polyvinyl toluene (PVT) has a short enough decay time to detect fast neutrons by time-separated multiple proton recoils.

Figure 11:
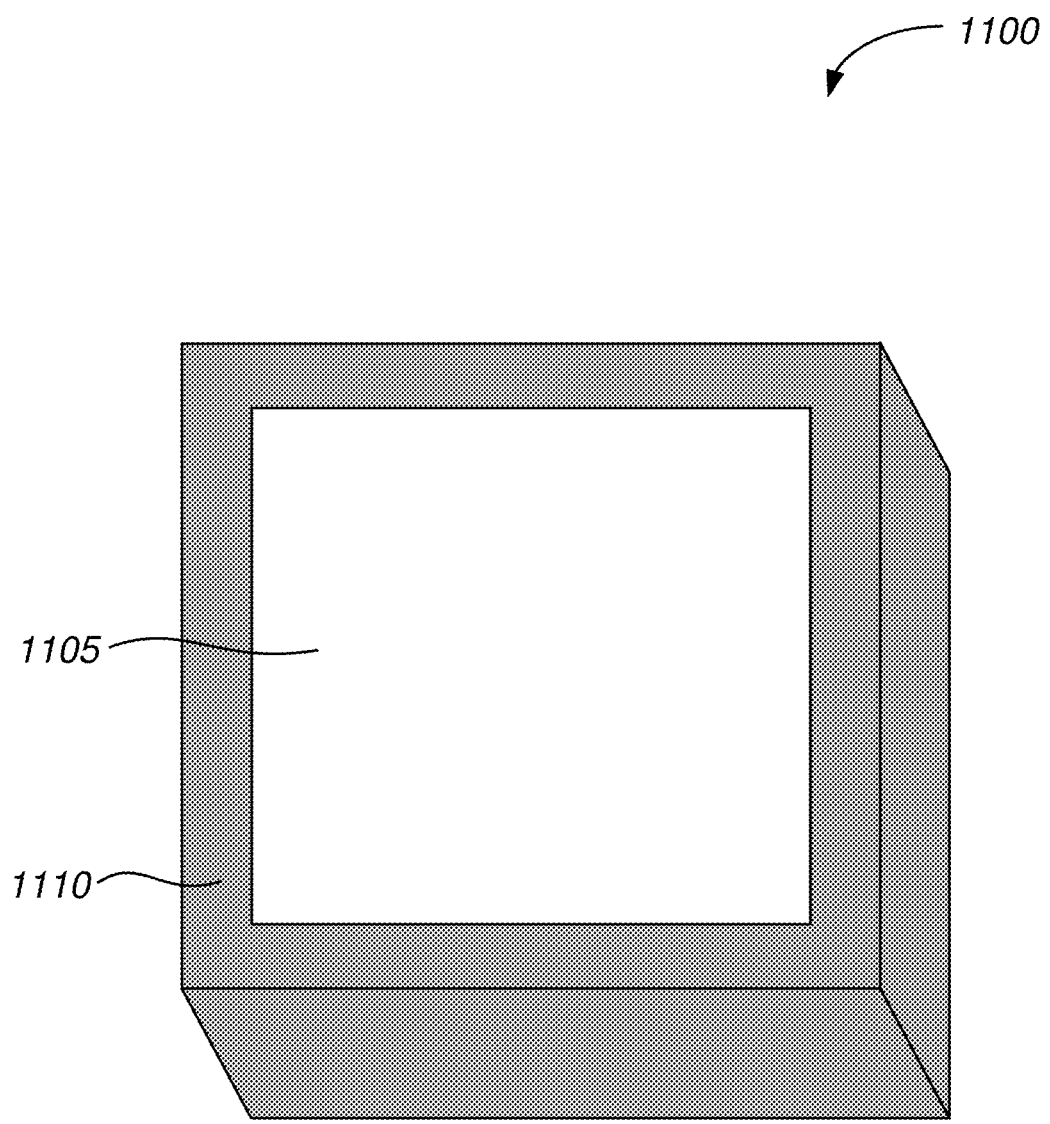
FIG. 11 shows an example of an illustration of a scintillator structure.
Figure 12A:
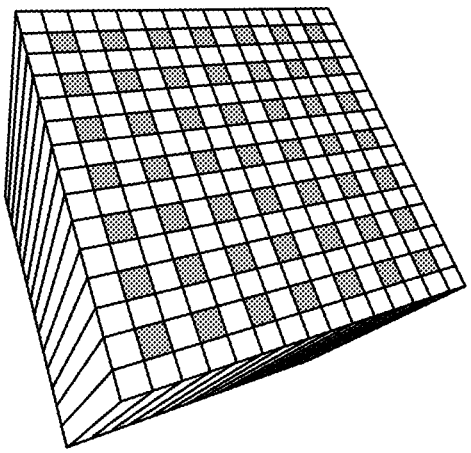
FIGS. 12A-12E show examples of illustrations of scintillator structures.
Figure 12B:
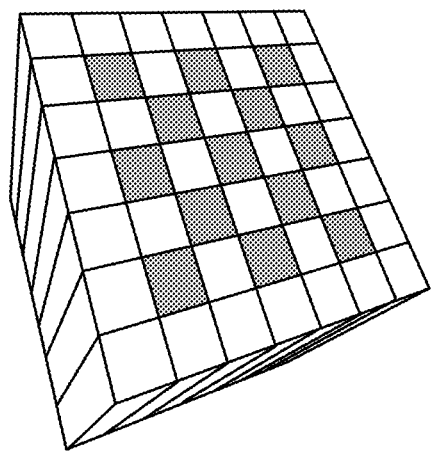
Figure 12C:
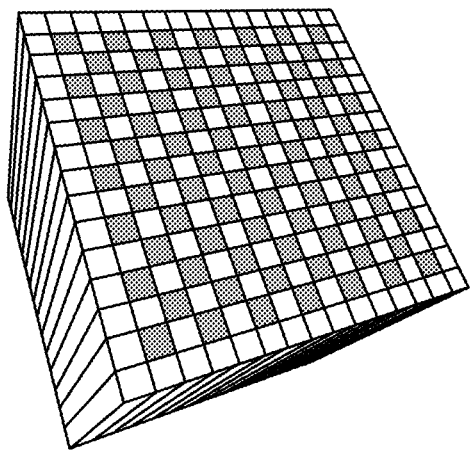
Figure 12D:
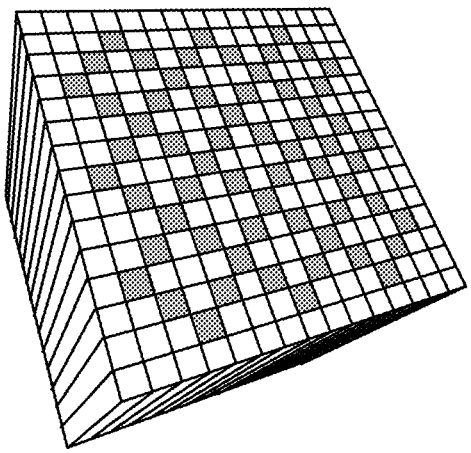
Figure 12E:
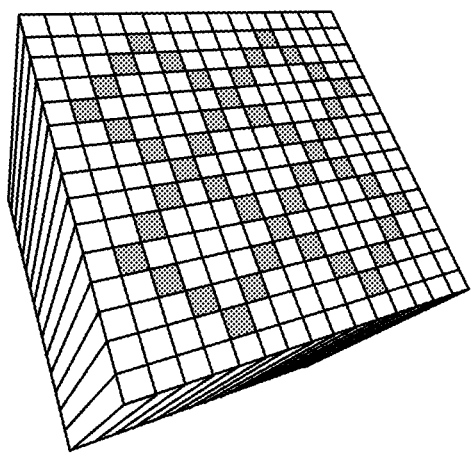
Figure 13A:
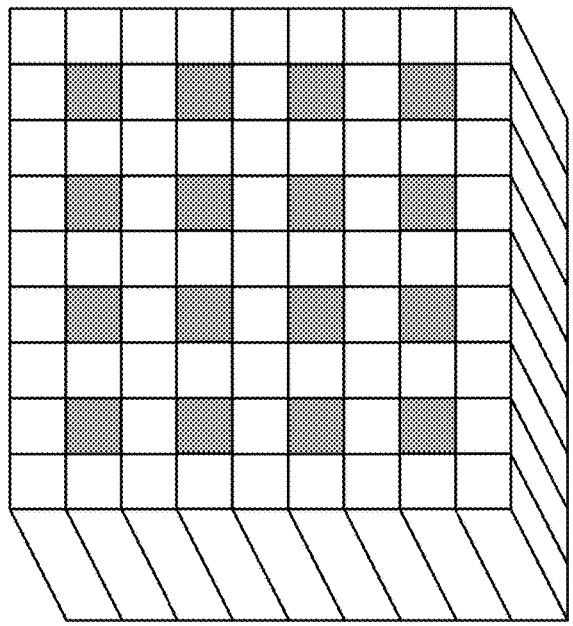
FIGS. 13A-13C show examples of illustrations of scintillator structures.
Figure 13B:
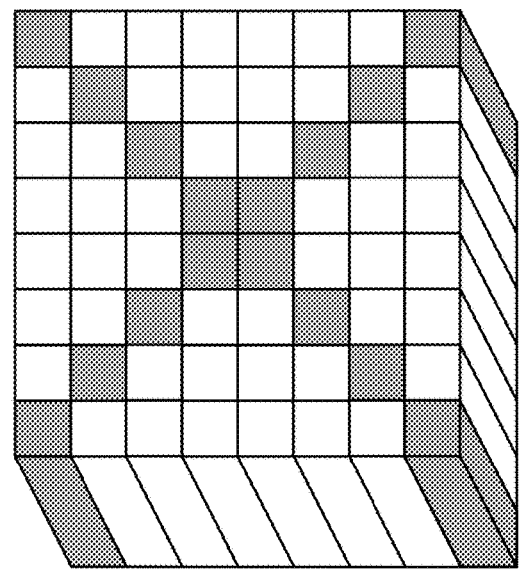
Figure 13C:
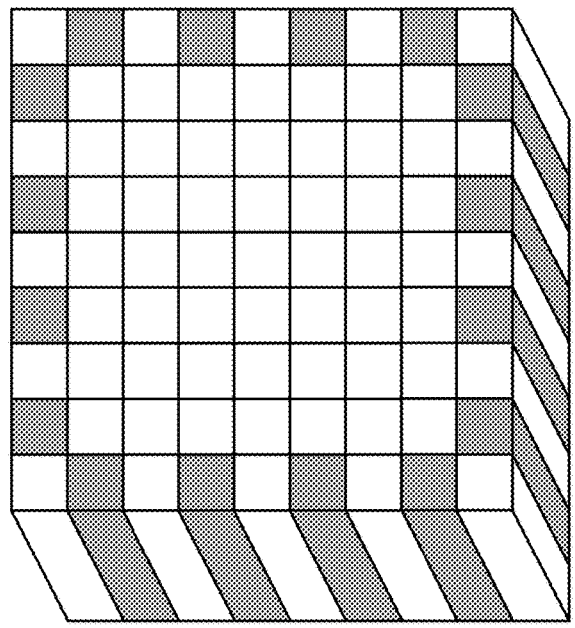

FIG. 11 shows an example of an illustration of a scintillator structure. Many different embodiments of a scintillator structure are possible. Further possible embodiments of a scintillator structure are described below with respect to FIGS. 12A-14. As shown in FIG. 11, in some embodiments a scintillator structure 1100 includes an organic scintillator element 1105 and an inorganic scintillator element 1110. The organic scintillator element 1105 has a square or a rectangular cross-section. The inorganic scintillator element 1100 surrounds the square or the rectangular cross-section of the organic scintillator element 1105 and forms an outer square or rectangular cross section.

In some embodiments, dimensions of the square or the rectangular cross-section of the organic scintillator element 1105 are about 4 centimeters (cm) to 90 cm by about 4 cm to 90 cm. In some embodiments, a thickness of the inorganic scintillator element 1110 surrounding and in contact with the square or the rectangular cross-section of the organic scintillator element 1105 is about 1 cm to 10 cm.

Returning to FIG. 10, in some embodiments, there is a photodetector for each of the scintillator elements. For example, in some embodiments there is a photodetector for each of the one or more inorganic scintillator elements, with each of the photodetectors positioned at the first surface of the scintillator structure 1005. In some embodiments, there is a photodetector for each of the one or more organic scintillator elements, with each of the photodetectors positioned at the second surface of the scintillator structure 1005.

In some embodiments, there is a photodetector for each of the scintillator elements. For example, in some embodiments there is a photodetector for each of the one or more inorganic scintillator elements, with each of the photodetectors positioned at the first surface of the scintillator structure 1005. In some embodiments, there is a photodetector for each of the one or more organic scintillator elements, with each of the photodetectors also positioned at the first surface of the scintillator structure 1005. In some embodiments, a reflective mask covers the second surface of the scintillator structure 1005. The reflective mask is operable to reflect light generated by the one or more inorganic scintillator elements and by the one or more organic scintillator elements to the first surface of the scintillator structure 1005.

In some embodiments, the first photodetector 1010 comprises a first phototube and the second photodetector comprises 1015 a second phototube. When phototubes are used as the photodetectors, the one or more organic scintillator elements are covered at the first surface of scintillator structure 1005 to block light from the one or more organic scintillator elements so that the first photodetector 1010 does not detect light generated by the one or more organic scintillator elements (i.e., the first photodetector 1010 detects light generated by the inorganic scintillator elements or the first photodetector 1010 only detects light generated by the inorganic scintillator elements). The one or more inorganic scintillator elements are covered at the second surface of scintillator structure 1005 to block light from the one or more inorganic scintillator elements so that the second photodetector 1015 does not detect light generated by the one or more inorganic scintillator elements (i.e., the second photodetector 1015 detects light generated by the organic scintillator elements or the second photodetector 1015 only detects light generated by the organic scintillator elements). In some embodiments, the material used to cover the scintillator elements is paint (e.g., an opaque paint) or an opaque material (e.g., tape).

In some embodiments, the first photodetector 1010 comprises a first array of silicon photomultipliers (SiPMs) and the second photodetector 1015 comprises a second array of silicon photomultipliers. In some embodiments, the first array of silicon photomultipliers is positioned to detect light generated by the one or more inorganic scintillator elements. In some embodiments, the second array of silicon photomultipliers is positioned to detect light generated by the one or more organic scintillator elements. In some embodiments, when the photodetectors comprise arrays of silicon photomultipliers, the one or more organic scintillator elements and the one or more inorganic scintillator elements are not covered at the appropriate ends of the scintillator structure.

In some embodiments, the detector 1000 includes reflective masks. In some embodiments, a first reflective mask covers the one or more organic scintillator elements at the first surface of the scintillator structure 1005. The first reflective mask is operable to reflect light generated by the one or more organic scintillator elements to the second surface of the scintillator structure 1005. In some embodiments, the first reflective mask also serves to block light from the one or more organic scintillator elements at the first surface of the scintillator structure 1005. In some embodiments, a second reflective mask covers the one or more inorganic scintillator elements at the second surface of the scintillator structure 1005. The second reflective mask is operable to reflect light generated by the one or more inorganic scintillator elements to the first surface of the scintillator structure 1005. In some embodiments, the second reflective mask also serves to block light from the one or more inorganic scintillator elements at the second surface of the scintillator structure 1005.

In operation, embodiments of the detectors described herein can detect neutrons, gamma rays, and perform gamma ray spectroscopy. Fast neutrons (e.g., typical energies above 0.2 MeV) that enter the scintillator structure are detected by the >2 nanosecond (ns) time separated multiple proton recoils in the organic scintillator elements. The fast neutrons do not produce a useful signal in the inorganic scintillator elements. All neutrons that enter the scintillator structure can be moderated to lower energies by elastic scattering in the organic scintillator elements.

Moderated neutrons (also referred to as slow neutrons) that were moderated by materials outside the scintillator structure or were moderated by the organic scintillator elements of the scintillator structure can be captured by neutron capture isotopes in the inorganic scintillator elements. The neutron capture signals in the inorganic scintillator elements are from heavy ions and all neutron captures produce uniform signals that are larger and slower than the signals from gamma ray interactions.

Gamma rays are detected through a rapid sequence of pair production (for energies above 1 MeV) and Compton interactions in both the organic and inorganic scintillator elements. The energy deposited by a gamma ray can be determined by combining the signals from the organic and inorganic scintillator elements. Total absorption of the gamma ray energy (necessary for gamma ray spectroscopy and isotope identification) is made possible by photoelectric interactions on the heavy element in the inorganic scintillator elements.

The scintillator structure 1100 shown in FIG. 11 is a useful configuration for detecting both fast and moderated neutrons and for measuring the energies deposited by gamma rays in an outer layer of the inorganic scintillator element 1110 and an inner structure of the organic scintillator element 1105. This scintillator structure provides good triple mode detection in a single structure.

FIGS. 12A-12E and FIGS. 13A-13C show examples of illustrations of scintillator structures. The scintillator structures shown in FIGS. 12A-12E and FIGS. 13A-13C comprise a plurality of organic scintillator elements (white elements) and a plurality of inorganic scintillator elements (grey elements). The plurality of organic scintillator elements and the plurality of inorganic scintillator elements can be arranged in different configurations. The plurality of organic scintillator elements and the plurality of inorganic scintillator elements are arranged such that there are substantially no gaps or substantially no open space between the plurality of organic scintillator elements and the plurality of inorganic scintillator elements.

In some embodiments, each of the plurality of organic scintillator elements and each of the plurality of inorganic scintillator elements has a cross section that eliminates or minimizes gaps between the scintillator elements when they are packed together. In some embodiments, all the plurality of organic scintillator elements have the same cross section. In some embodiments, all the plurality of inorganic scintillator elements have the same cross section. In some embodiments, all the plurality of organic scintillator elements and all the plurality of inorganic scintillator elements have the same cross section.

In some embodiments, each of the plurality of organic scintillator elements and each of the plurality of inorganic scintillator elements has a square cross section. In some embodiments, each of the plurality of scintillator elements is about 0.5 cm to 10 cm by about 0.5 cm to 10 cm, or about 1 cm by 1 cm.

Other cross section sections that can be close packed can also be used. For example, in some embodiments, each of the plurality of organic scintillator elements and each of the plurality of inorganic scintillator elements has a hexagonal cross section or a regular hexagonal cross section. In some embodiments, a cross-sectional dimension of each of the plurality of scintillator elements is about 0.5 centimeters to 10 centimeters, or about 1 cm.

Depending on the cross sectional dimensions of each of the plurality of scintillator elements and the specified dimensions of the scintillator structure, about 9 to 225 of the scintillator elements may be used in the scintillator structure. For example, the scintillator structures shown in FIGS. 12A-12E comprise 225 scintillator elements arranged in a 15×15 array. The scintillator structures shown in FIGS. 13A and 13C comprise 81 scintillator elements arranged in the 9×9 array. The scintillator structure shown in FIG. 13B comprises 64 scintillator elements arranged in the 8×8 array. The scintillator structures shown in FIG. 2 comprise 100 scintillator elements (e.g., 36 inorganic scintillator elements and 64 organic scintillator elements) arranged in a 10×10 array.

Figure 14:
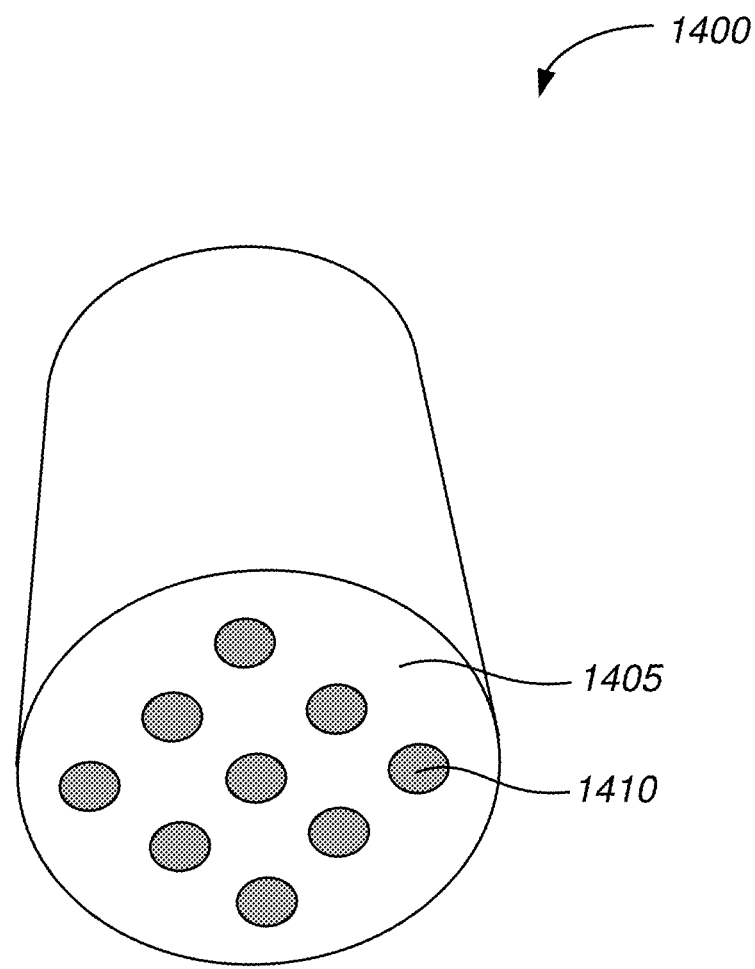
FIG. 14 shows an example of an illustration of a scintillator structure.

FIG. 14 shows an example of an illustration of a scintillator structure. The scintillator structure 1400 shown in FIG. 14 comprises an organic scintillator element 1405 in the form of a cylindrical block (e.g., a right circular cylinder) with inorganic scintillator elements in the form of cylinders (e.g., right circular cylinders) distributed within the organic scintillator element 1405.

A number of different scintillator structures have been described above. Other configurations of scintillator structures are possible.

In some embodiments, the detector has directional sensitivity. For example, when the detector includes a scintillator structure that comprises organic scintillator elements and inorganic scintillator elements, the scintillator elements closer to the radiation source will have a larger signal due to the scintillator elements further from the radiation source being shadowed by the scintillator elements closer to the radiation source.

EXAMPLES

The following examples are intended to be examples of the embodiments disclosed herein, and are not intended to be limiting.

Below, we present Monte Carlo calculations of the detection efficiency of organic/inorganic composite scintillator arrays for the triple-mode detection of fast neutrons, moderated neutrons, and for full gamma-ray absorption. This is in contrast with previous designs that discriminate against gamma rays but do not combine the signals in the organic and inorganic scintillators to provide gamma-ray spectroscopy.

The composite scintillator designs were based on two factors: (1) compactness (about 10 cm×10 cm×5 cm) and (2) the use of the available scintillator materials (e.g., $Cs_2LiLaBr_6$:Ce (CLLB) with 90% $^6Li$ and polyvinyl toluene (PVT)).

The nuclear physics Monte Carlo package MCNP6.2 (Los Alamos National Laboratory, New Mexico, USA) was used to compute the detection efficiency of composite arrays of CLLB and PVT for neutrons with incident energies from 0.1 eV to 5 MeV, and the full energy absorption efficiency for gamma rays from 0.1 to 5 MeV. This code simulates the random elastic and inelastic processes that occur when neutrons and gamma rays interact in the detectors. For this application, important processes include (1) neutron moderation, the elastic scattering of neutrons on hydrogen, where, on an average, half of the neutron energy is imparted to the recoil proton, (2) neutron capture by $^6Li$, which results in the production of a 2.05-MeV $^3H$ ion and a 2.73-MeV $^4He$ ion, and (3) the Compton, pair production, photoelectron, and bremsstrahlung processes that occur when gamma rays interact with the electrons and nuclei in the detector. The results of the calculations are presented below.

Composite Scintillator Structure Designs.

All composite scintillator structure designs used 100 scintillators 1 cm×1 cm×5 cm. Of these, 36 were CLLB and 64 were PVT. Design A (FIG. 1) consisted of separate scintillators, a 6×6 array of CLLB and an 8×8 array of PVT. In designs B1, B2, and B3 (FIG. 2), the 100 scintillators were arranged in different ways in a single 10×10 block. Design B1 is analogous to currently used portal monitors, where $^3He$ wire chambers are embedded in a large block of polyethylene that moderates the energies of incident neutrons by elastic scattering on hydrogen. Design B2 distributes the CLLB elements throughout the PVT array to shorten the distances between hydrogen elastic scattering centers and the $^6Li$ capture centers. Design B3 places the CLLB in an outer layer to increase the detection efficiency for low energy neutrons and gammas.

In these designs, low energy neutrons are moderated by the PVT and detected by $^6Li$ capture in the CLLB. Discrimination against gamma rays is provided by the shape of the CLLB light pulse. Fast neutrons are detected by the time separation of multiple proton recoils in the PVT. This PSD strategy has a lower energy threshold than $^6Li$ and $^{10}B$ loaded organic scintillators (0.1 versus 0.5 MeV). Gamma-ray spectroscopy uses combined signals from the CLLB and PVT (with suitable weighting) to compute the total energy deposited.

A compact readout system can be constructed using SiPMs coupled with individual scintillators. The energy deposited in the CLLB and PVT arrays can be determined from the sum of the corresponding SiPM outputs.

Monte Carlo N-Particle (MCNP) Calculations.

The nuclear physics Monte Carlo package MCNP6.2 was used to compute the detection efficiencies of the four designs for (1) neutrons using $^6Li$ capture, (2) fast neutrons using time-separated multiple proton recoils, and (3) gamma rays with full-energy absorption. In each calculation, 100,000 neutrons or gammas entered perpendicular to and were randomly distributed over the surfaces outlined by the heavy black rectangles in FIGS. 1 and 2. All calculations were done in the analog mode, where every particle has a weight of one.

The PVT materials card selected the cross section tables 1001.90c (ENDF/B-VII.1) and 6012.50c (ENDF/B-V.0) for $^1H$ and $^{12}C$, respectively. The PVT MT card specified the thermal neutron cross-section table poly.20t (ENDF/B-VII.0). The neutron energy cutoff was zero.

The CLLB materials card selected the cross-section tables 3006.80c, 3007.80c, 35079.80c, 35081.80c, 55133.80c, and 57139.80c (ENDF/B-VII.1) for $^6Li$, $^7Li$, $^{79}Br$, $^{81}Br$, $^{133}Cs$, and $^{139}La$, respectively.

Results—Neutron Detection Using $^6Li$ Capture.

Under active interrogation (e.g., photofission), fissionable isotopes (e.g. $^{235}U$, $^{238}U$, $^{239}Pu$, $^{240}Pu$)) produce neutrons with similar energy spectra that peak at 1 MeV and decrease with increasing energy by a factor of about 10 at 5 MeV. $^{240}Pu$ (produced with $^{239}Pu$) emits about 1000 neutrons per gram per second from spontaneous fission. Elastic scattering in surrounding materials can shift the spectrum at the scintillator structure to lower energies. For this reason, composite designs B1, B2, and B3 incorporate hydrogen to moderate incident neutrons over the full energy range and improve the $^6Li$ capture efficiency.

Two methods were used to determine the $^6Li$ capture efficiency for designs A, B1, B2, and B3. The first method used the F8:N tally system and the second method counted the $^4He$ ions in the PTRAC files that list every interaction history. Both methods produced nearly identical results. Several of the isotopes in CLLB have a large number of closely spaced capture resonances, so rather than performing the calculation at discrete neutron energies the calculation was done by randomly distributing the neutron energies within 11 energy bands (0.1-1 eV . . . 2-5 MeV), as shown in FIGS. 3-5.

Figure 3:
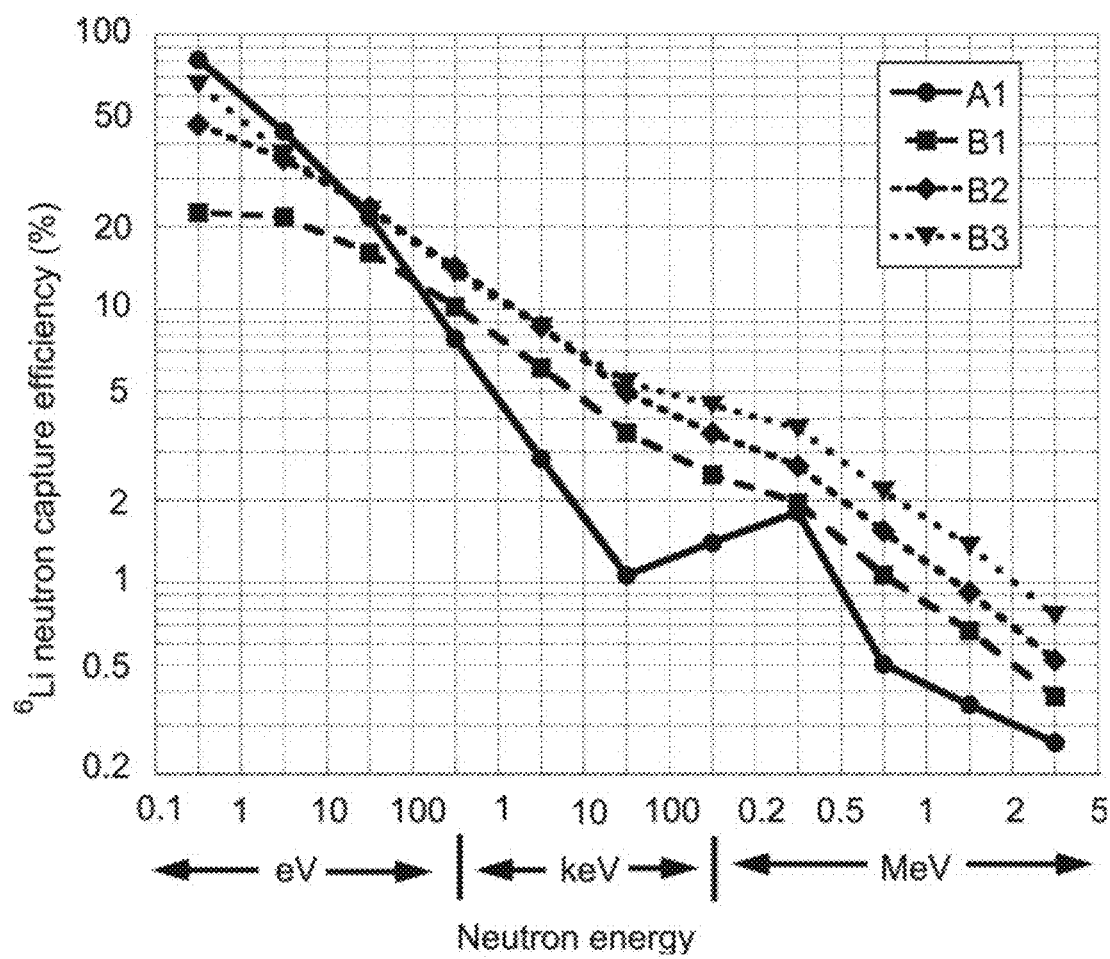
FIG. 3 shows the probability that a neutron is detected by $^6$Li capture for designs A and B1-B3. Neutrons are uniformly distributed in 11 energy bands (e.g., 0.1-1 eV ... 2-5 MeV). Data are plotted in the center of each band.

FIG. 3 shows the probability of $^6Li$ capture (the intrinsic efficiency) using 100 000 neutrons in each of the 11 energy bands for designs A, B1, B2, and B3. The efficiency data are plotted in the center of each band. The dominant capture process is $^6Li(n, ^3H)^4He$. The peak in efficiencies near 0.2 MeV corresponds to a corresponding peak in the cross-section for the capture process $^6Li(n, n' ^2H)^4He$.

Figure 4:
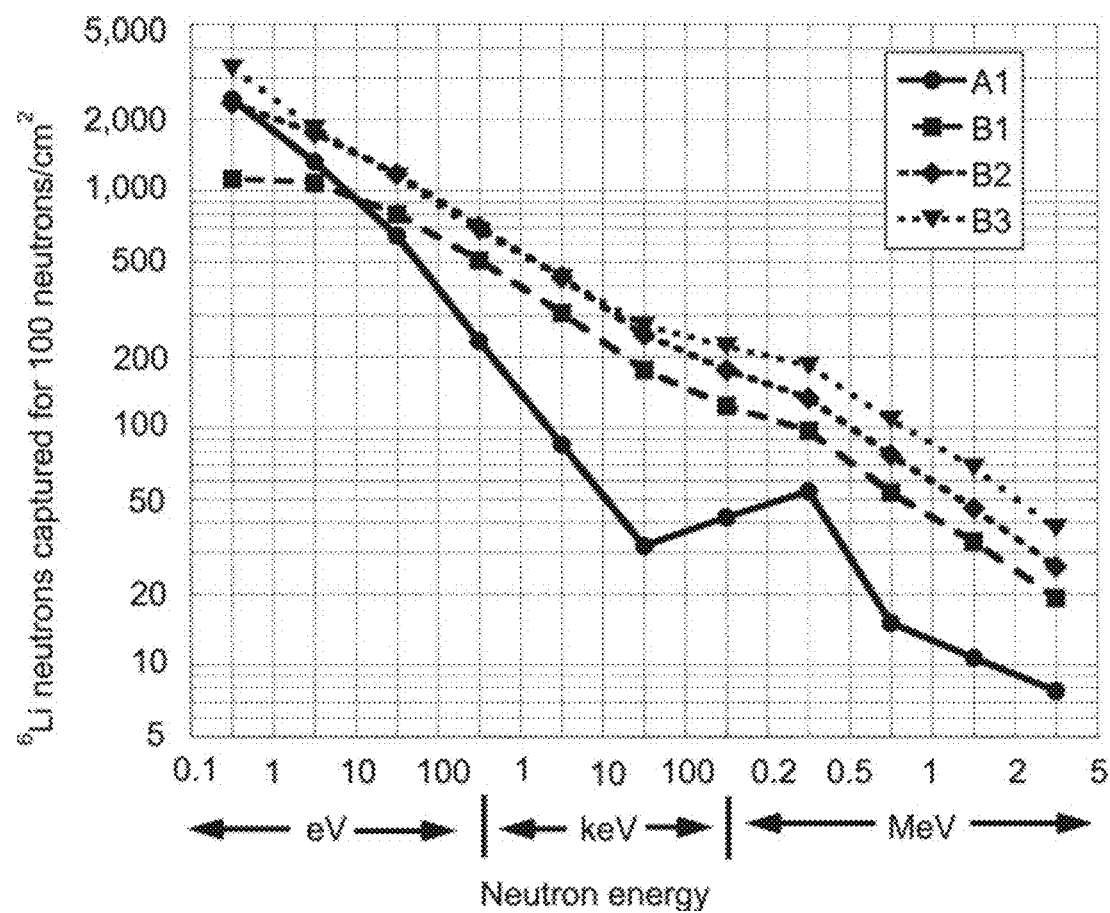
FIG. 4 shows the number of neutrons detected by $^6$Li capture for 100 neutrons/cm$^2$ for designs A and B1-B3. Neutrons are uniformly distributed in 11 energy bands (e.g., 0.1-1 eV ... 2-5 MeV). Data are plotted in the center of each band.
Figure 5:
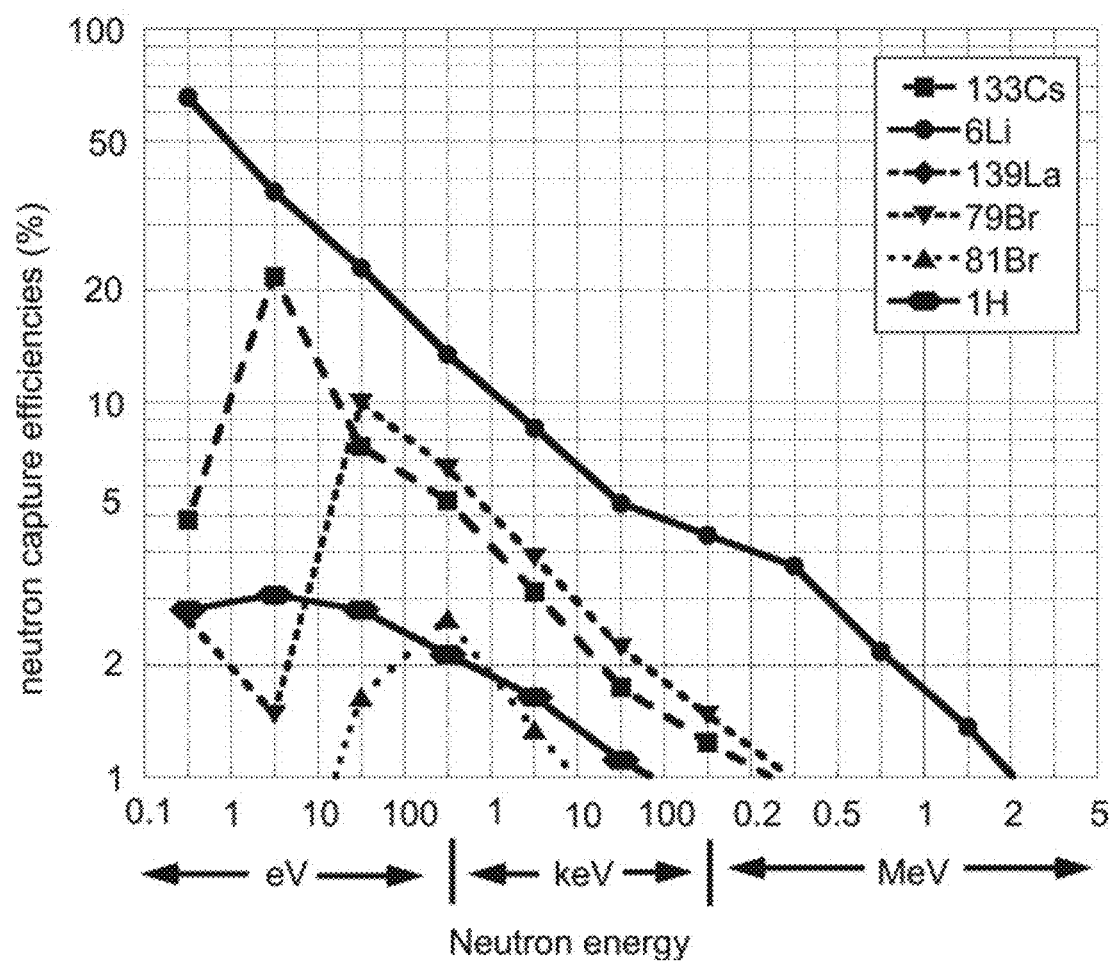
FIG. 5 shows the most significant neutron capture probabilities for the isotopes present in design B3. $^6$Li is dominant over all energies.

FIG. 4 shows the number of captures (the absolute efficiency) for 100 neutrons/$cm^2$, computed by multiplying the number of neutrons received by the intrinsic efficiency values (FIG. 3). The absolute efficiency is a proper comparison for scintillator structures at a fixed distance from a source. For 100 neutrons/$cm^2$, array A1 received 3000 neutrons and designs B1, B2, and B3 received 5000 neutrons. In general, the designs B1, B2, and B3 have higher absolute efficiencies than A1 because they have larger geometrical efficiency, and the hydrogen in PVT moderates the neutrons to lower energies, where the $^6Li$ capture cross-section is higher. Of all the designs, B3 has the highest absolute efficiency for neutrons over the entire energy range.

Table I lists the intrinsic detection efficiency for design B3 along with the statistical uncertainty in the MCNP tally output. These values agree almost perfectly with the number of $^3$H and $^4$He ions reported in the PTRAC output files and with binomial statistics. Table I also lists the average number of scatters before $^6$Li capture and the neutron energy at capture, both determined by analyzing the PTRAC files. In the lower energy bands, $^6$Li capture occurs after a few scatters. With increasing neutron energy, more scatters occur before capture. While these scatters reduce the neutron energy (especially those on the hydrogen in PVT), the last column of Table I shows that capture occurs at average energies well above the thermal energy of 0.025 eV.

TABLE I

Neutron 6Li capture statistics for design B3.
The 100,000 neutrons were generated in each energy
Range with a uniform random distribution.

| Neutron energy range | Intrinsic $^6$Li detection efficiency (%)* | Number of scatters before capture | Average neutron energy at capture |
|---|---|---|---|
| 0.1-1 eV | 65.6 ± 1.5 | 1.2 | 0.41 eV |
| 1-10 eV | 36.7 ± 1.5 | 1.3 | 2.9 eV |
| 10-100 eV | 23.0 ± 1.3 | 3.3 | 19 eV |
| 100 eV-1 keV | 13.5 ± 1.1 | 5 | 114 eV |
| 1-10 keV | 8.57 ± 0.09 | 7 | 600 eV |
| 10-100 keV | 5.38 ± 0.07 | 8 | 3.6 keV |
| 0.1-0.2 MeV | 4.43 ± 0.06 | 9 | 19 keV |
| 0.2-0.5 MeV | 3.65 ± 0.05 | 8 | 56 keV |
| 0.5-1 MeV | 2.16 ± 0.04 | 9 | 58 keV |
| 1-2 MeV | 1.36 ± 0.04 | 15 | 140 keV |
| 2-5 MeV | 0.76 ± 0.04 | 15 | 470 keV |

*±one standard deviation

FIG. 5 shows the most significant neutron capture probabilities for all the isotopes in design B3. Resonant capture by 133Cs in the 1-10-eV band, by 79Br in the 100-1000-eV band, and by 81Br in the 10-100-eV band, are evident. Capture by hydrogen is also seen below 100 keV.

Results—Fast Neutron Detection Using Time-Separated.

Figure 6:
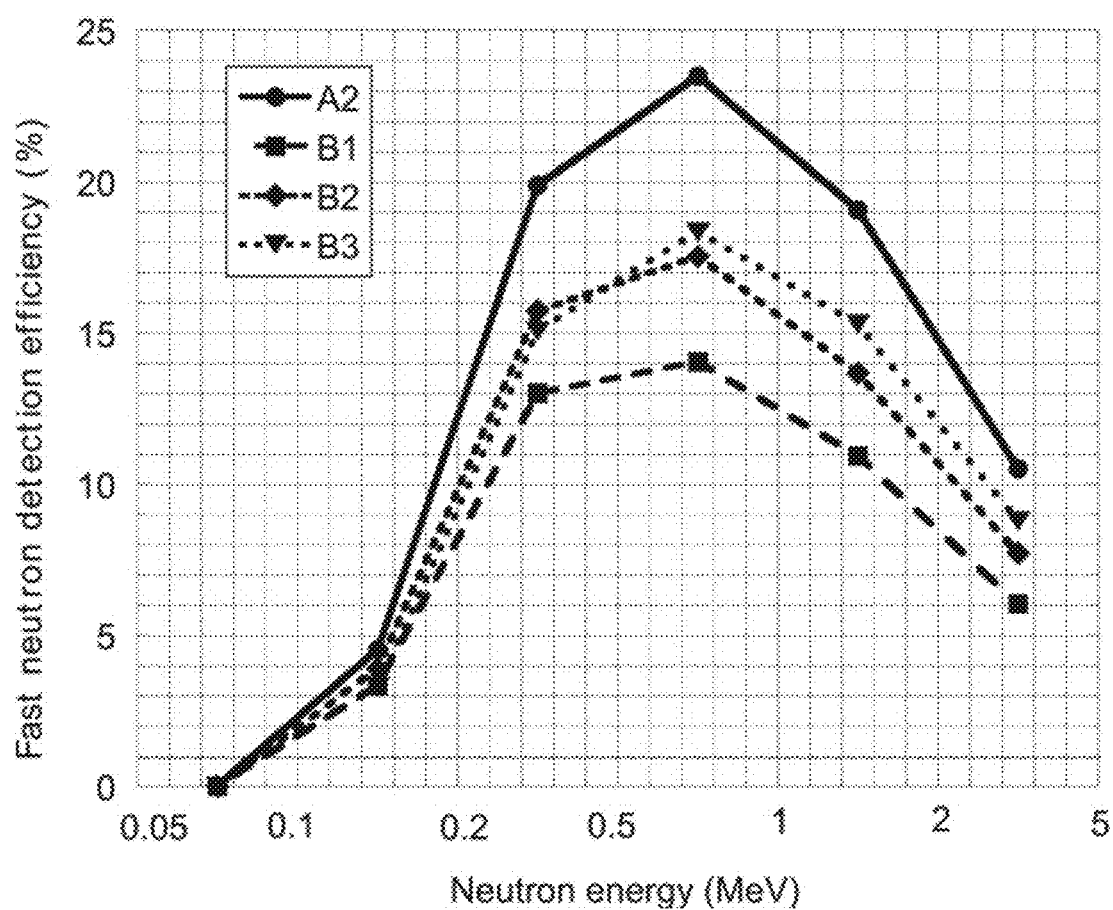
FIG. 6 shows the fast neutron detection efficiency; i.e., the probability that an incident neutron will produce two proton recoils >50 keV and >2 ns apart. Neutrons are uniformly distributed in six energy bands (e.g., 0.05-0.1 MeV ... 2-5 MeV). Data are plotted in the center of each band.
Figure 7:
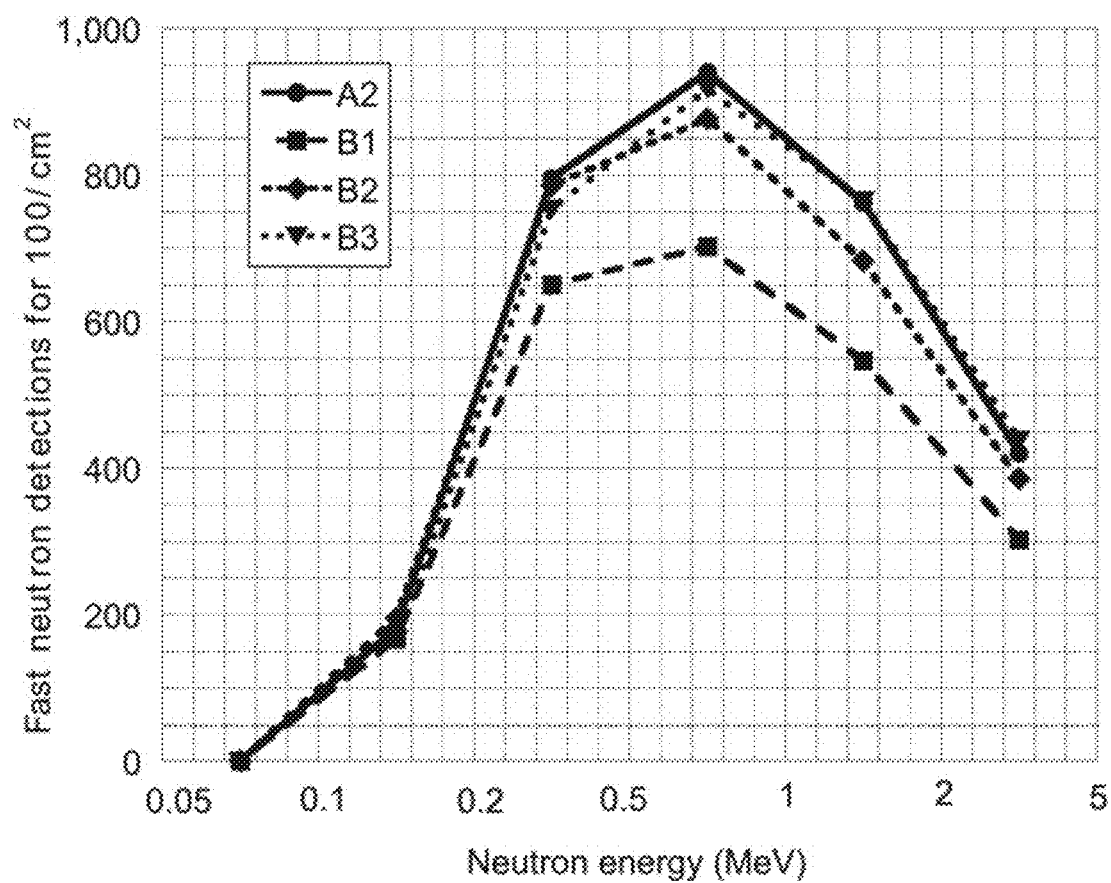
FIG. 7 shows the number of fast neutrons detected for 100/cm$^2$. Detection requires two proton recoils >50 keV and >2 ns apart. Neutrons are uniformly distributed in six energy bands (e.g., 0.05-0.1 MeV ... 2-5 MeV). Data are plotted in the center of each band.

Calculations for fast neutrons in the PVT scintillators were done for 100 000 neutrons in each of the six energy bands from 0.05-0.1 to 2-5 MeV (FIGS. 6 and 7). For each neutron interaction history in the PTRAC files, a successful neutron detection requires at least two recoil protons above 50 keV that are separated in time by at least 2 ns.

FIG. 6 shows the probability (intrinsic efficiency) of the four hydrogen-containing arrays that an incident neutron will produce two proton recoils above 50 keV and separated by more than 2 ns, using 100,000 neutrons. Gamma rays can make multiple Compton interactions in the PVT, but the light from two interactions separated by a distance of 5 cm will be separated in time by about 0.25 ns and appear as a single pulse. The scintillation decay time of PVT is 1.6 ns. Estimation of the power of this method to discriminate against gamma rays for different pulse heights and short/long integration times is beyond the scope of these calculations.

FIG. 7 shows the number of captures (the absolute efficiency) for 100 neutrons/cm$^2$, computed by multiplying the number of neutrons received by the intrinsic efficiency values (FIG. 6). For 100 neutrons/cm$^2$, array A2 received 4000 neutrons and designs B1, B2, and B3 received 5000 neutrons. The absolute fast neutron detection efficiency for the best composite designs is similar to A2.

Results—Total Gamma-Ray.

Figure 8:
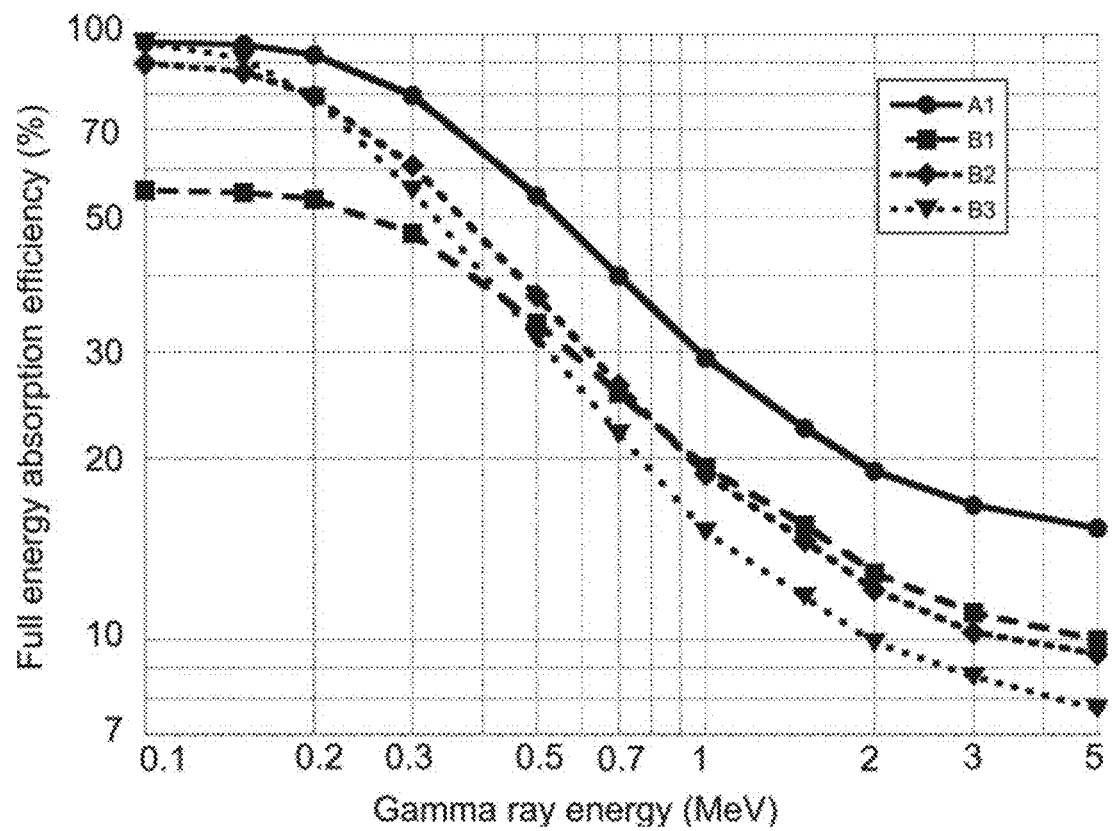
FIG. 8 shows the full energy absorption efficiency for designs A and B1-B3, including single and double escapes.
Figure 9:
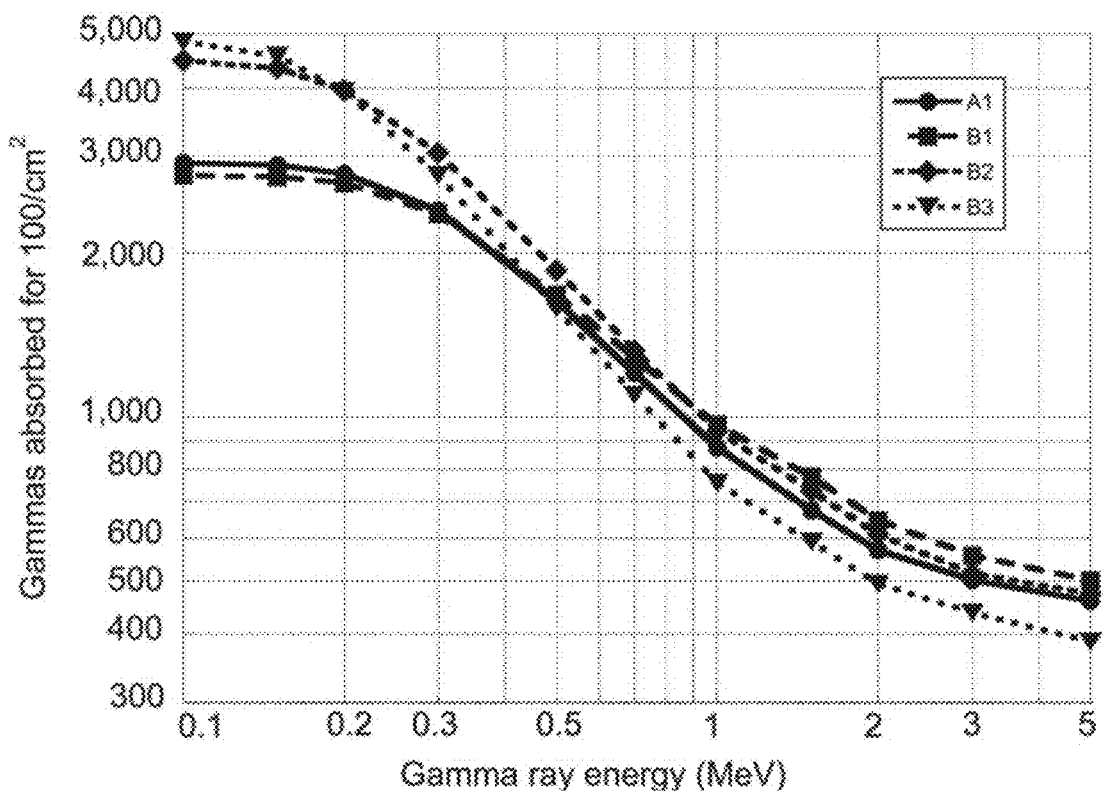
FIG. 9 shows the number of gamma rays fully absorbed for 100/cm$^2$ for designs A and B1-B3, including single and double escapes.

The MCNP6.2 code was used to compute the energy deposited in designs A, B1, B2, and B3 for 100,000 gamma rays at 11 discrete energies from 0.1 eV to 5 MeV. (FIGS. 8 and 9). An F8:P tally card was used along with an E8 card that listed the energies defining the full energy peak, and for gammas above 1 MeV, the single and double escape peaks.

Figure 2:
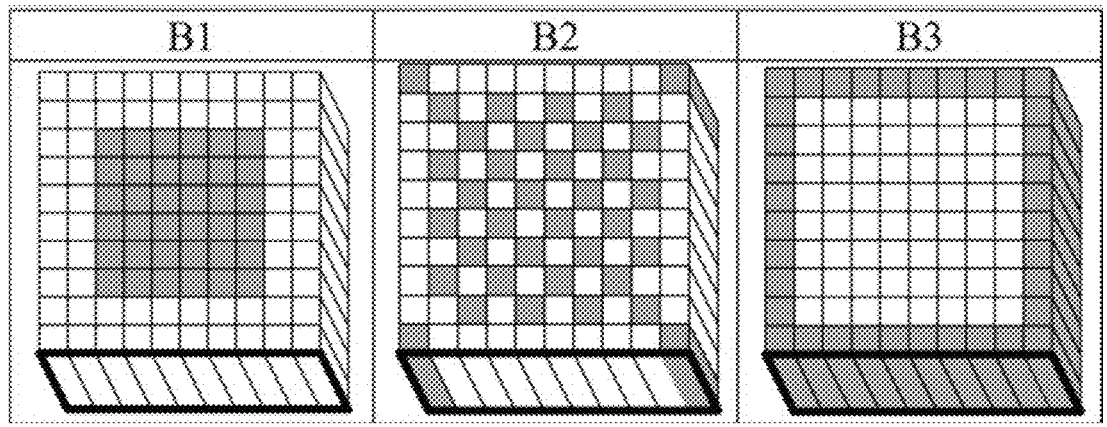
FIG. 2 shows the composite scintillator structure design for which detection efficiencies were calculated. Composite scintillator structure designs B1-B3 comprise 10×10 arrays of 36 CLLB (gray) and 64 PVT (white) scintillators.

FIG. 8 shows the probabilities of full energy absorption (intrinsic efficiency) for gamma rays entering the heavy black rectangles in FIGS. 1 and 2. For gammas below 1 MeV this is the probability that a gamma ray will lose all of its energy in the scintillator structure by a combination of Compton scattering, photoelectric absorption, and bremsstrahlung of the recoil electrons.

Above 1 MeV electron—positron pairs are produced. The positrons will annihilate with nearby electrons to produce pairs of 511-keV annihilation photons. This results in three peaks in the energy spectrum, corresponding to zero, single and double annihilation photon escapes. The three peaks were combined to compute the full energy absorption efficiencies.

FIG. 9 shows the number of gamma rays whose energies are fully absorbed (absolute efficiency) for 100 gammas/cm$^2$, computed by multiplying the number of gammas received by the intrinsic efficiency values (FIG. 8). For 100 gammas/cm$^2$, array A1 received 3000 gammas and designs B1, B2, and B3 received 5000 gammas. Designs A and B1 have the lowest absolute efficiency below 0.5 MeV: A1 because of its lower surface area of the CLLB array and B1 because more gamma rays Compton scatter in the outer PVT scintillators before they can reach the central CLLB scintillators.

Discussion Composite arrays of CLLB and PVT can provide excellent neutron detection over the full neutron energy range. A feature of the composite designs presented herein is the ability to combine the signals from both scintillators to determine the total gamma-ray energy deposited in the scintillator structure.

1. For neutrons of all energies, design B3 provides a better arrangement than A, B1, or B2 for moderating incident neutrons with hydrogen and detecting them with $^6$Li capture.
2. Detection of moderated neutrons using $^6$Li capture occurs at an average energy well above the 0.025-eV thermal energy.
3. For detecting fast neutrons using multiple proton recoils and absorbing gamma rays for spectroscopy, design B3 is among the best choices.
4. For neutrons above 0.2 MeV, detecting multiple time-separated recoil protons in the PVT has a higher efficiency than moderation in PVT and $^6$Li capture.
5. Design A has the best gamma-ray energy resolution because of the high luminosity of CLLB in array A1.

CONCLUSION

Further details regarding the embodiments described herein can be found in S. E. Derenzo and E. Bourret, "Monte Carlo Calculations of the Detection Efficiency of Composite Scintillator Arrays for Fast and Moderated Neutrons, and for Gamma-Ray Spectroscopy," in IEEE Transactions on Nuclear Science, vol. 67, no. 6, pp. 888-893, June 2020, which is herein incorporated by reference.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A detector comprising:
a scintillator structure, the scintillator structure comprising:
an organic scintillator, the organic scintillator in the form of one or more elements of a specified length; and
an inorganic scintillator, the inorganic scintillator in the form of one or more elements of the specified length, first ends of the one or more organic scintillator elements and first ends of the one or more inorganic scintillator elements defining a first surface, second ends of the one or more organic scintillator elements and second ends of the one or more inorganic scintillator elements defining a second surface,
the one or more organic scintillator elements on the first surface of scintillator structure being covered with an opaque material, and the one or more inorganic scintillator elements on the second surface of the scintillator structure being covered with the opaque material.

2. The detector of claim 1, further comprising:
a first photodetector positioned at the first surface of the scintillator structure; and
a second photodetector positioned at the second surface of the scintillator structure.

3. The detector of claim 2, wherein the first photodetector comprises a first phototube, wherein the second photodetector comprises a second phototube, wherein the one or more organic scintillator elements being covered with the opaque material at the first surface of scintillator structure blocks light generated by the one or more organic scintillator elements at the first surface of scintillator structure, and wherein the one or more inorganic scintillator elements being covered with the opaque material at the second surface of the scintillator structure blocks light generated by the one or more inorganic scintillator elements at the second surface of the scintillator structure.

4. The detector of claim 2, wherein the first photodetector comprises a first array of silicon photomultipliers (SiPMs), wherein the first array of silicon photomultipliers is positioned to detect light generated by the one or more inorganic scintillator elements, wherein the second photodetector comprises a second array of silicon photomultipliers, and wherein the second array of silicon photomultipliers is positioned to detect light generated by the one or more organic scintillator elements.

5. The detector of claim 1, wherein the one or more organic scintillator elements and the one or more inorganic scintillator elements are arranged such that there are essentially no gaps between the one or more organic scintillator elements and the one or more inorganic scintillator elements.

6. The detector of claim 1, wherein the detector is operable to detect fast neutrons and slow neutrons and to perform gamma ray spectroscopy.

7. The detector of claim 1, wherein an organic scintillator element has a square or a rectangular cross-section, and wherein an inorganic scintillator element surrounds the square or the rectangular cross-section of the organic scintillator element and forms an outer square or rectangular cross section.

8. The detector of claim 7, wherein dimensions of the square or the rectangular cross-section of the organic scintillator element are about 4 centimeters to 90 centimeters by about 4 centimeters to 90 centimeters.

9. The detector of claim 7, wherein a thickness of the inorganic scintillator element surrounding and in contact with the square or the rectangular cross-section of the organic scintillator element is about 1 centimeter to 10 centimeters.

10. The detector of claim 1, wherein the specified length of the one or more elements of the organic scintillator and one or more elements of the inorganic scintillator is about 2 centimeters to 8 centimeters.

11. The detector of claim 1, wherein the inorganic scintillator comprises a heavy-atom inorganic scintillator that includes 6Li or B10.

12. The detector of claim 1, wherein the inorganic scintillator is a scintillator from the group $Cs_2LiLaBr_6$:Ce (CLLB), $Cs_2LiYCl_6$:Ce (CLYC), and NaI(Tl+Li).

13. The detector of claim 1, wherein the organic scintillator comprises a fast plastic scintillator.

14. The detector of claim 1, wherein the organic scintillator is polyvinyl toluene (PVT).

15. The detector of claim 1, wherein the opaque material covering the one or more organic scintillator elements on the first surface of scintillator structure comprises a first reflective mask, the first reflective mask operable to reflect light generated by the one or more organic scintillator elements to the second surface of the scintillator structure, and wherein the opaque material covering the one or more inorganic scintillator elements on the second surface of scintillator structure comprises a second reflective mask, the second reflective mask operable to reflect light generated by the one or more inorganic scintillator elements to the first surface of the scintillator structure.

16. The detector of claim 1, wherein the one of more organic scintillator elements and the one or more inorganic scintillator elements comprise 9 to 225 scintillator elements.

17. The detector of claim 16, wherein each of the one of more organic scintillator elements and each the one or more inorganic scintillator elements has a square cross section, and wherein dimensions of the square cross section of each of the one of more organic scintillator elements and dimensions of the square cross section of each of the one of more inorganic scintillator elements are the same.

18. The detector of claim 16, wherein dimensions of the square cross section are about 0.5 centimeters to 10 centimeters.

19. The detector of claim 16, wherein each of the one of more organic scintillator elements and each the one or more inorganic scintillator elements has a hexagonal cross section, and wherein dimensions of the hexagonal cross section of each of the one of more organic scintillator elements and dimensions of the hexagonal cross section of each of the one of more inorganic scintillator elements are the same.

20. The detector of claim 1, wherein the organic scintillator element comprises a cylinder, and wherein the one or more inorganic scintillator elements comprise cylinders disposed in the organic scintillator element.

* * * * *